(12) United States Patent
Yu et al.

(10) Patent No.: US 7,495,666 B2
(45) Date of Patent: Feb. 24, 2009

(54) INTELLIGENT GRAPH RANGE FOR COMPUTER ALGEBRA SYSTEM

(75) Inventors: Jinsong Yu, Sammamish, WA (US);
Seth R. Atkinson, Redmond, WA (US);
William Ben Kunz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 292 days.

(21) Appl. No.: 11/321,550

(22) Filed: Dec. 29, 2005

(65) Prior Publication Data
US 2007/0153001 A1 Jul. 5, 2007

(51) Int. Cl.
*G06T 11/20* (2006.01)
(52) U.S. Cl. .................................... 345/440; 345/440.1
(58) Field of Classification Search ....... 345/440–440.1
See application file for complete search history.

(56) References Cited
OTHER PUBLICATIONS

Matlab, copyright 1994-1999 by MathWorks, Using Matlab manual, pp. 1-585, http://www-ccs.edu/matlab/pdf-doc.*

Matlab, copyright 1994-1999 by MathWorks, Using Matlab graphics manual, pp. 1-488, http://www-ccs.ucsd.edu/matlab/pdf-doc.*

* cited by examiner

*Primary Examiner*—Jin-Cheng Wang
(74) *Attorney, Agent, or Firm*—Workman Nydegger

(57) ABSTRACT

Mathematical expressions and functions are graphed using a computer implemented method that automatically determines an appropriate graph range. One implementation of the method begins with determining an initial variable seed range. A number of points within this seed range are randomly selected. The method determines whether the selected points correspond to the mathematical expression (i.e., whether they produce valid results when the expression is evaluated at each point). When the selected points produce valid results, the points can be used to generate and display a graph of the mathematical expression on a user display device, with a graph range based on the seed range. If not, the variable seed range can be expanded until a predetermined number of the selected points correspond to the mathematical expression, so that a graph of the mathematical expression can be generated and displayed.

19 Claims, 11 Drawing Sheets

INTELLIGENT GRAPH RANGE FOR COMPUTER ALGEBRA SYSTEM

BACKGROUND

A number of advances in the fields of educational software and learning tools have been made in recent years. One of the more significant developments includes computer algebra systems (CAS) that can solve and graph advanced mathematical functions, including symbolic algebra, complex mathematical relationships, and calculus. These new software-based tools offer significant improvements over the software packages and devices available just 10 years ago. One of the more promising aspects of these newly developed tools is the benefit they can provide as a learning aid. For example, when students are learning new concepts in mathematics, and particularly in algebra and calculus, an illustration can be invaluable in enabling a better understanding of the underlying principles. However, a student learning a mathematical concept involving a function to be graphed may not have the requisite knowledge to select a graphing range for the function. Many devices such as graphing calculators require a student to first enter a range for an equation in order to graph the equation. Failure to provide the range or providing an incorrect range may cause a syntax error to be indicated. With such devices, a student without the experience necessary to correctly select an appropriate range for graphing mathematical functions may not be able to proceed with displaying a graph and therefore will not benefit from this useful learning aid. In other systems, a predefined range may be hard-coded into the system. However a fixed range has limited application for many functions and may preclude some functions from being displayed in a useful manner, since the scale that is used may not be particularly useful in visualizing the relationship between the variables.

Therefore, there is an interest in providing solutions to these and other problems related to graphing functions, particularly for applications relating to mathematical software and graphing calculators. It would be desirable to develop an approach that enables a wide variety of mathematical expressions and functions to be graphed without specifically requiring a user to first enter a graphing range and that is able to determine an appropriate range for a graph more effectively than can be done by simply using a default graph range.

SUMMARY

Various implementations are discussed below that enable the graphing of mathematical expressions. In particular, the mathematical expression can be graphed automatically through a computer implemented method that does not require a user to provide a graph range. Further details of an exemplary implementation are presented below. This implementation includes the step of determining an initial variable seed range as a starting point used in a multi-step process to arrive at a result. In this implementation, after the seed range is determined, a number of points within the seed range are selected. In one embodiment, these points are randomly selected within the seed range. Next, the method determines whether the selected points correspond to the mathematical expression. If so, the selected points can be used to generate and display a graph of the mathematical expression on a user display device, using a graph range that is based on the seed range. Alternatively, if the selected points do not correspond to the mathematical expression, then the variable seed range can be expanded until a predetermined number of the selected points correspond to the mathematical expression so that a useful graph of the mathematical expression can be generated and displayed.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figures and Disclosed Embodiments Are Not Limiting

Exemplary embodiments are illustrated in referenced Figures of the drawings. It is intended that the embodiments and Figures disclosed herein are to be considered illustrative rather than restrictive.

Exemplary Computing System

Figure 1:
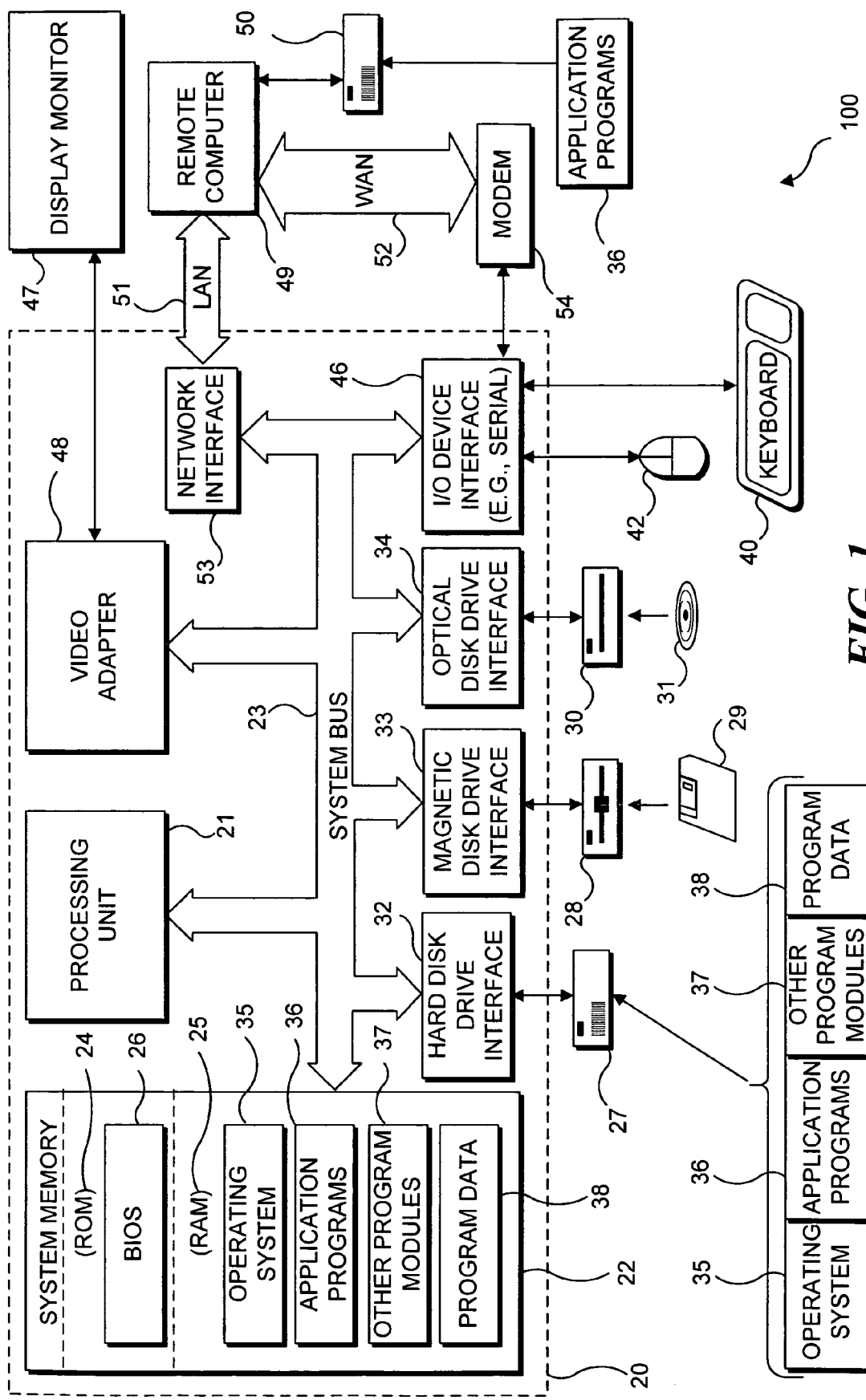
FIG. 1 is a functional block diagram of a generally conventional computing device such as a personal computer (PC) that is suitable for implementing one or more graphing functions.

FIG. 1 is a functional block diagram of an exemplary computing device and/or computer server for carrying out various aspects of graphing functions in accord with the present approach, such as over a network, via the Internet, or on the computing device. The following discussion is intended to provide a brief, general description of a suitable computing environment in which certain methods discussed below may be implemented. Further, the following discussion illustrates a context for implementing computer-executable instructions, such as program modules, with a computing system. Generally, program modules include routines, programs, objects, components, data structures, etc., that perform particular tasks or implement particular abstract data types. The skilled practitioner will recognize that other computing system configurations may be applied, including multiprocessor systems, mainframe computers, personal computers, processor-controlled consumer electronics such as calculators and the like, and personal digital assistants (PDAs). One implementation includes distributed computing environments where tasks are performed by remote processing devices that are linked through a communications network. In a distributed computing environment, program modules may be located in both local and remote memory storage devices. In another implementation, the computing device of the following discussion can refer specifically to a hand-held computing device, such as a calculator which can be used for solving and graphing mathematical expressions.

The system shown in FIG. 1 includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25.

A basic input/output system 26 (BIOS), which contains the fundamental routines that enable transfer of information between elements within the PC 20, such as during system start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer-readable media provide nonvolatile storage of computer-readable machine instructions, data structures, program modules, and other data for PC 20. Although the described exemplary environment includes a hard disk drive 27, removable magnetic disk 29, and removable optical disk 31, those skilled in the art will recognize that other types of computer-readable media, which can store data and machine instructions that are accessible by a computer, such as magnetic cassettes, flash memory cards, digital video disks (DVDs), Bernoulli cartridges, RAMs, ROMs, and the like, may also be used.

A number of program modules and/or data may be stored on hard disk drive 27, magnetic disk 29, optical disk 31, ROM 24, or RAM 25, including an operating system 35, one or more application programs 36, other program modules 37, and program or other data 38. A user may enter commands and information in PC 20 and provide control input through input devices, such as a keyboard 40 and a pointing device 42. Pointing device 42 may include a mouse, stylus, wireless remote control, or other user interactive pointer. As used in the following description, the term "mouse" is intended to encompass any pointing device that is useful for controlling the position of a cursor on the screen. Other input devices (not shown) may include a microphone, joystick, haptic joystick, yoke, foot pedals, game pad, satellite dish, scanner, or the like. Also, PC 20 may include a Bluetooth radio or other wireless interface for communication with other interface devices, such as printers or a network. These and other input/output (I/O) devices can be connected to processing unit 21 through an I/O interface 46 that is coupled to system bus 23. The phrase "I/O interface" is intended to encompass each interface specifically used for a serial port, a parallel port, a game port, a keyboard port, and/or a universal serial bus (USB). Optionally, a monitor 47 can be connected to system bus 23 via an appropriate interface, such as a video adapter 48. In general, PCs can also be coupled to other peripheral output devices (not shown), such as speakers (through a sound card or other audio interface—not shown) and printers.

Certain processes, described in detail below, can be practiced on a single machine, although PC 20 can also operate in a networked environment using logical connections to one or more remote computers, such as a remote computer 49. Remote computer 49 can be another PC, a server (which can be configured much like PC 20), a router, a network PC, a peer device, or a satellite or other common network node, (none of which are shown), and a remote computer will typically include many or all of the elements described above in connection with PC 20, although only an external memory storage device 50 for the remote computer has been illustrated in FIG. 1. The logical connections depicted in FIG. 1 include a local area network (LAN) 51 and a wide area network (WAN) 52. Such networking environments are common in offices, enterprise-wide computer networks, intranets, and the Internet. In one particular implementation, PC 20 is a component of a game development environment that includes other computing devices, such as server computers, other PCs, databases, and the like.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Exemplary Operating Environments

Figure 2:
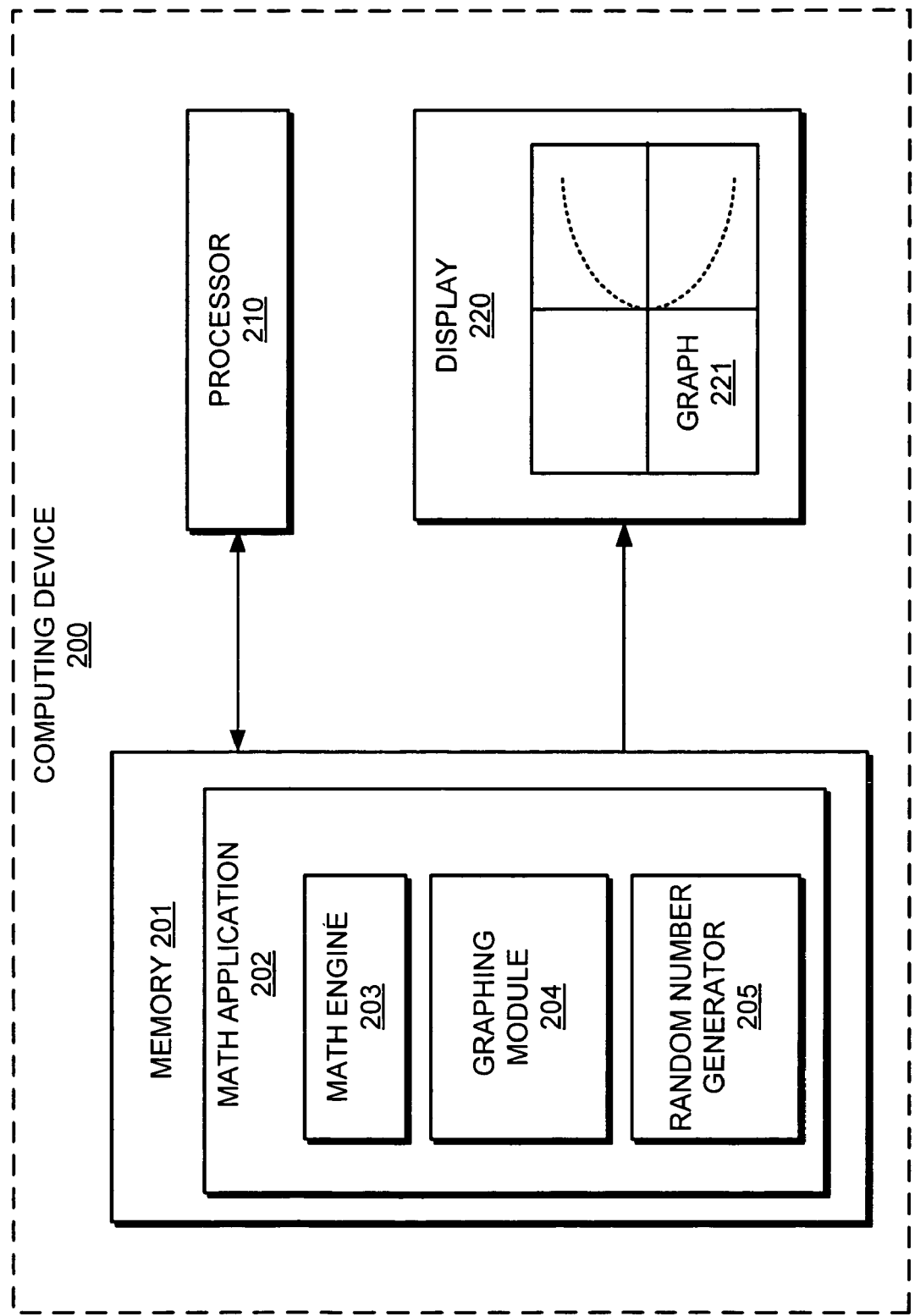
FIG. 2 is a functional block diagram of an exemplary computing device for graphing a mathematical expression.

FIG. 2 is a functional block diagram of an exemplary computing device 200, which is suitable for implementing methods for graphing mathematical expressions in accord with the present approach. Computing device 200 can be any suitable computing device such as, for example, PC 20 of FIG. 1, a graphing calculator, or another consumer device. Computing device 200 includes a memory 201, a processor 210 and a display 220. Memory 201 stores machine instructions for carrying out a math application 202, which includes a math engine 203, a graphing module 204, and a random number generator 205. Display 220 is shown displaying a graph 221.

Processor 210 can be any processor capable of executing machine language instructions, such as microcontrollers, microprocessors, and the like. Memory 201 can be any memory device including volatile and nonvolatile addressable memory space usable for storing machine language instructions, data structures, and executable software modules. Display 220 can be any display device usable for displaying graphs of mathematical expressions such as liquid crystal displays (LCD), plasma displays, cathode ray tube (CRT) displays, and the like.

Math application 202 is indicated in FIG. 2 as comprising software instructions stored in memory 201, but alternatively, the math application can comprise hardware or firmware (not shown). Whether implemented as software instructions or as hardware or firmware, the math application enables a user to enter, solve, and/or graph a wide variety of mathematical expressions. In some implementations, math application 202 is a computer algebra system (CAS), which will be familiar to the skilled practitioner. In these implementations, math engine 203 is capable of resolving symbolic mathematical expressions and executing various algorithms that can converge on a solution to symbolic expressions. In other implementations, math application 202 can be hard-coded in firmware, for example, math engine 203, graphing module 204 and random number generator 205 can all be integrated into an application specific integrated circuit (ASIC), such as when computing device 200 is embodied as a graphing calculator. In other implementations (not shown), math engine 203, and graphing module 204 can be external modules that are in communication with math application 202, rather than being integrated with math application 202.

Graphing module 204 can be any software, hardware, or firmware that enables math application 202 to automatically generate a graph range for a mathematical expression, symbolic or otherwise, that is provided by a user. In one implementation, graphing module 204 is specifically configured to determine an initial variable seed range, select points within the initial variable seed range, and then evaluate the mathematical expression for each of the selected points to determine if the points are valid, and when enough of the points are deemed valid, then use the seed range and resulting valid points to generate and display a graph of the mathematical expression on a user display device.

Random number generator 205 can be any software, hardware, or firmware that provides math application 202 with random or pseudo-random numbers and/or number sequences. Such random number generators will be familiar to the skilled practitioner and will not be further discussed.

Figure 3:
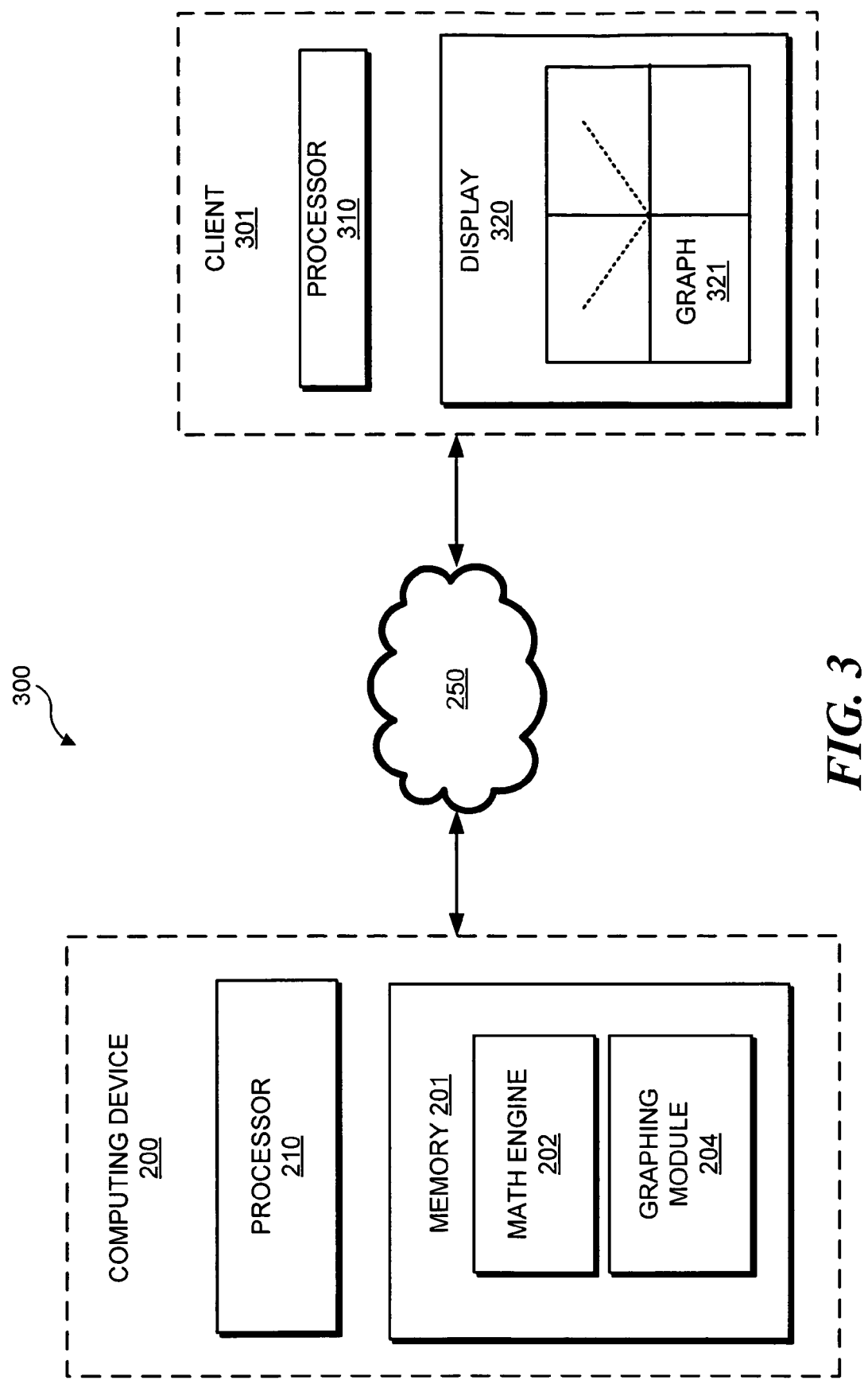
FIG. 3 is another functional block diagram of a distributed system for graphing a mathematical expression.

By way of further illustration, FIG. 3 is functional block diagram of a distributed system 300 for graphing a mathematical expression and illustrates another suitable operating environment. In FIG. 3, computing device 200 of FIG. 2 is configured as a server computer and is shown in communication with a client 301 (e.g., PC 20) over a communication system 250. Computing device 200 can be assumed to include each of the components discussed with reference to it in FIG. 2, including a random number generator, and a communication interface, but these elements are omitted in FIG. 3, for clarity simplification of the Figure.

Client 301 includes a processor 310, and a display device 320, which are each analogous to the corresponding devices discussed with reference to computing device 200 in regard to FIG. 2. Generally, client 301 can be any suitable computing device, such as PC 20 in FIG. 1, or may be a graphing calculator, or another consumer computing device intended for graphing mathematical expressions or functions. In one implementation, client 301 may be a "thin client," and thus contain minimal processing and memory capabilities, relying upon server 200 to provide certain applications and processing functionality. For example, client 301 may comprise a CAS that incorporates automated graph range generation capabilities. Such "thin client" systems are particularly useful in educational environments such as mathematics learning centers that employ a large number of computing devices.

Exemplary Techniques for Generating Graph Ranges

Figure 4:
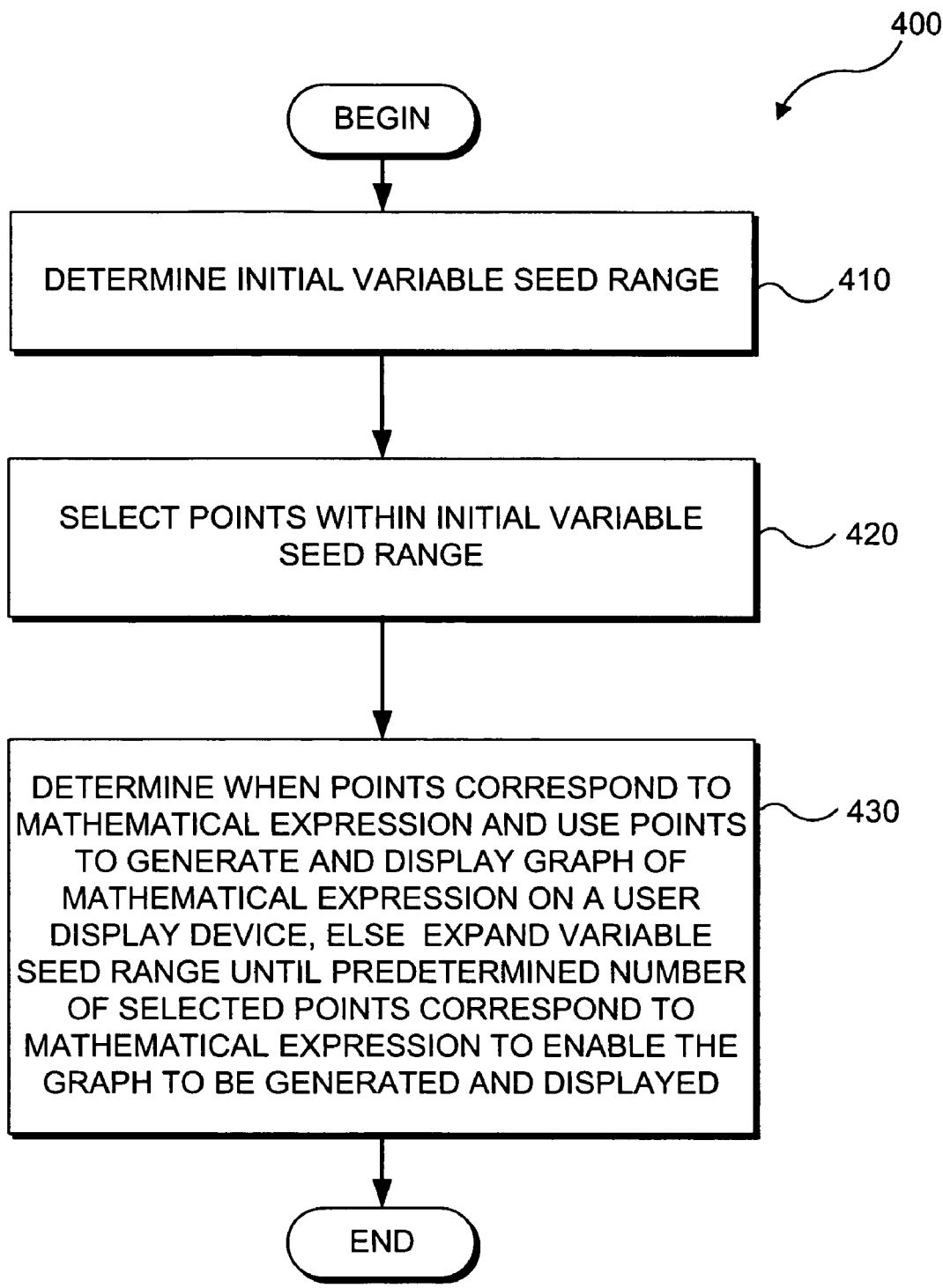
FIG. 4 is a flow diagram illustrating the steps of an exemplary method for graphing a mathematical expression.

FIG. 4 is a flow diagram illustrating the steps of an exemplary method for graphing a mathematical expression. Method 400 can be implemented in some embodiments with components, devices, and techniques as discussed with reference to FIGS. 1-3. In some implementations, one or more steps of method 400 are embodied on a computer-readable medium that stores computer-readable code so that a series of steps are implemented when the computer-readable code is executed on a computing device, such as a microprocessor. In the following description, various steps of method 400 are described and can be carried out by a processor of a computing device such as those described above. In some implementations, certain steps of method 400 can be either combined or separated into additional steps, and performed simultaneously or in a different order, without deviating from the objective of method 400 or without producing different results.

Method 400 begins at a step 410, when an initial variable seed range is determined for a mathematical expression. The seed range can be determined at any time that a graph software module is active to enable the function. In some implementations, the mathematical expression for which the initial variable seed range is desired is received from a user interface. Additionally, in some implementations, a user can select a trigonometry unit mode, which will be operable until another trigonometry unit mode is selected by a user. In one particular implementation, the determination includes additional steps such as first determining whether the mathematical expression is a Cartesian function, a polar function, a cylindrical function, or a spherical function. Next, a user selected trigonometry unit mode, such as degrees, radians, or grads, is determined. Finally, a predetermined initial variable seed range associated with the determined function type and trigonometry unit mode can be selected. Thus, in one implementation, exemplary predetermined ranges can be: in degrees [−180, 180] and [−1/180, 1/180]; in radians [−π, π] and [−1/π, 1/π]; and, in grads [−200, 200], [−1/200, 1/200] when the variable is in a trigonometry function or the variable is a polar, spherical or cylindrical variable, and [−2, 2] otherwise. It should be noted that the foregoing ranges are intended to be merely exemplary and not limiting. Indeed, the selection of predetermined ranges that may be hard-coded into a graphing module can vary considerably, depending upon the capabilities of the associated math engine, and the expected level of sophistication of the intended user. In general, a heuristic approach to establishing an initial variable seed range is quite effective. One heuristic implementation is further discussed below with reference to FIG. 7.

In a step 420, a number of points are selected within the initial variable seed range. The number of data points selected can be any suitable number from tens of points to thousands (or more) of points, depending on factors such as memory space, available processing power, mathematical expression type, display size, and other relevant factors. In one implementation, the step of selecting points within the initial variable seed range includes an additional step of applying a random number sequence in order to choose a number of random points within the initial variable seed range. This implementation can include other steps such as invoking a pseudo-random number generator in order to generate a pseudo-random number sequence and then employing the generated sequence as a variable in a predefined process, such as a point generator algorithm, in order to produce a set of essentially random points within the initial variable seed range. One reason to select points at random is that the function to be graphed may not be defined for some of the sample points. For example, the function f(x)=ln(x) is not defined for x≦0. Another reason for pursuing random sample points instead of equidistant sample points, is that many mathematical functions are periodic (e.g., f(x)=sin(x)). Therefore, using equidistant sample points within a seed range includes an inherent risk of having the period of a function collide with the distance between the sample points, which will result in a poor sampling of the function values. However, a byproduct of using true random sample points is that in certain cases, a graphing range can change slightly, even for the same function and initial variable seed range. A pseudo-random number generator having the characteristic that the same random seed generates the same random number sequence can be employed to provide a more consistent user experience within each user session, particularly if the random number seed is reset to the same value prior to each run of the procedure.

In a step 430, the logic determines whether the points selected in step 420 correspond to the mathematical expression. When correspondence is confirmed, the selected points can be used to generate a graph range and then display a graph of the mathematical expression on a user display device. However if correspondence is not confirmed, the variable seed range should then be selectively expanded until enough of the selected points correspond to the mathematical expression to enable the graph of the mathematical expression to be generated and displayed. This can be an iterative process. In one implementation, the determination of whether enough of the selected points correspond to the mathematical expression is based upon at least a predetermined number of sample points lying within the seed range so as to enable a graph of the mathematical expression to be generated. In one example, the points include a definition domain of the mathematical function (e.g., the function is defined on the sample points). In another example, the predetermined number can be a percentage of the total number of points. In another implementation, the step of determining whether the selected points correspond to the mathematical expression can include additional steps, such as evaluating the mathematical expression at each of the points, to determine whether each evaluated point corresponds to a valid point for graphing. In this implementation, when the evaluated point is determined not to be a valid point for the mathematical expression, the point can be identified as an invalid point with a flag or other marker. In still another implementation, the logic can determine if too many invalid points lie within the initial seed, and if so, provides an indicator that reports that the initial variable seed range does not contain enough valid points for graphing the mathematical expression.

In another implementation, if the logic determines that the initial variable seed range does not contain enough valid points for graphing the mathematical expression, a second seed range is generated, based on the initial variable seed range, by applying a predetermined scaling factor to the initial variable seed range. In this implementation, the scaling factor can be viewed as an expandable windowing function. This new range is then tested and expanded again until the logic determines that the new range contains enough valid points. In yet another implementation, such as when several iterations of windowing have failed to produce a second seed with enough valid points to generate a graph of the mathematical expression, the process can terminate and display an error message indicating that the function is undefined over too many points and therefore, cannot be graphed.

Yet another implementation includes a step of determining when each of the selected points is within a small sub-range of the initial variable seed range. If so, the logic substitutes the smaller sub-range for the initial variable seed range to increase the graph resolution. This particular implementation can also be viewed as employing a negative scaling factor as a windowing function, as will be apparent to the skilled practitioner.

In some implementations, using the selected points to generate and display a graph of the mathematical expression on a user display device can include additional steps such as first sorting the plurality of points, then identifying a portion of the plurality of points, and finally applying a predetermined scaling factor to the identified portion of points to determine a graphing range. In this implementation, the mathematical function can be generated and graphed on the user display device based on this determined graphing range.

Figure 5:
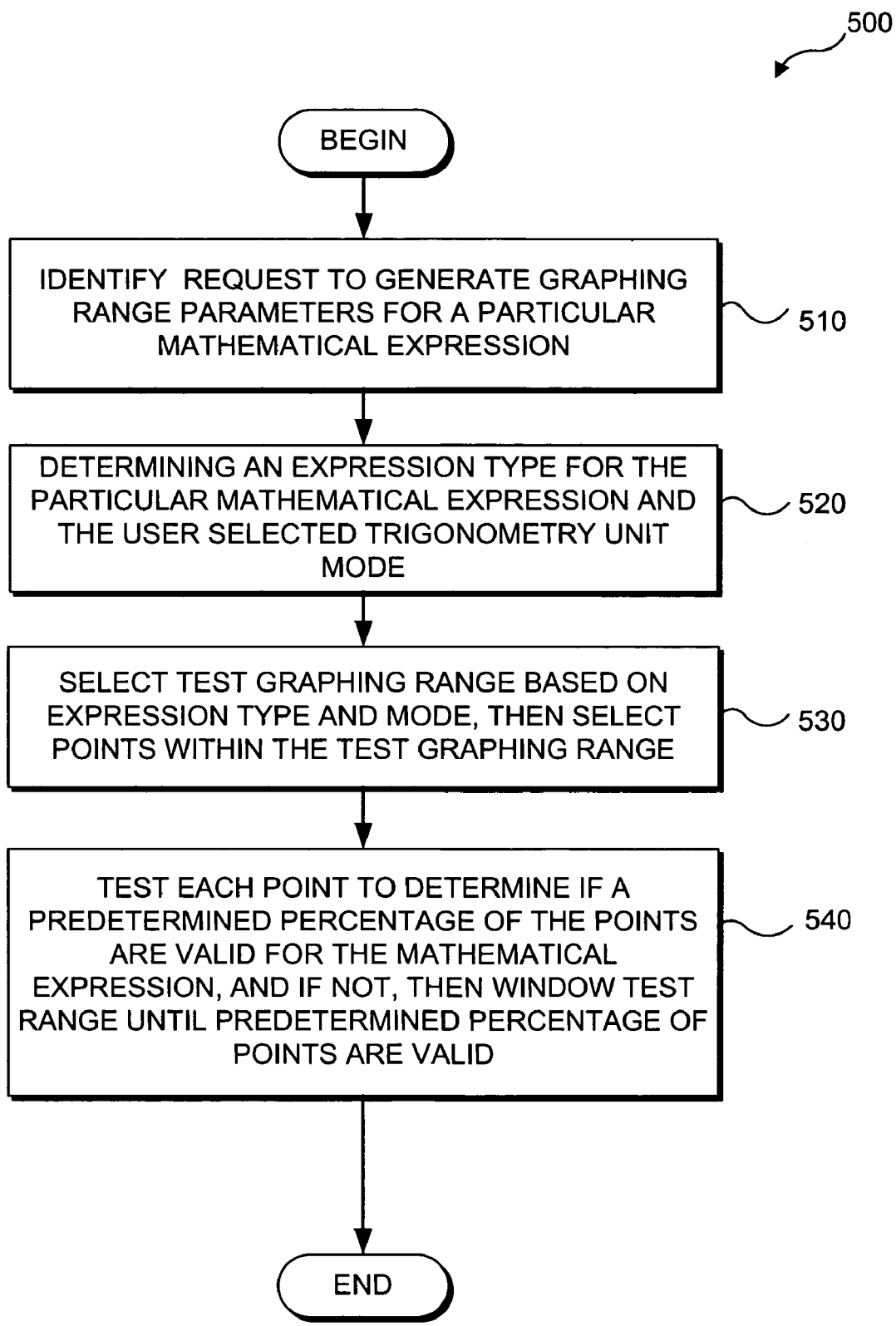
FIG. 5 is a flow diagram illustrating the steps of an exemplary method for graphing a mathematical relationship.

FIG. 5 is a flow diagram illustrating the steps of an exemplary method for graphing a mathematical relationship. Method 500 can be implemented in some embodiments using the components and techniques discussed above with reference to FIGS. 1-3. In some implementations, one or more steps of method 500 are embodied in a computer-readable medium containing computer-readable code so that a series of steps are implemented when the computer-readable code is executed on a computing device, such as a microprocessor. In the following description, parts of method 500 are described with respect to a processor of a client device that can perform certain method steps, in communication (as appropriate) with a server that can perform other parts of the method. In some implementations, certain steps of method 500 can be combined or subdivided, and performed simultaneously or in a different order, without deviating from the objective of method 500 or without producing different results. Method 500 begins at a step 510.

In step 510, a request from a math engine to generate graphing range parameters for a particular mathematical expression is identified. The request can be identified at any time after the math engine has generated the request. In one implementation, the request can originate from a client process and be received and identified by a server process.

In a step 520, an expression type and trigonometry unit mode for the particular mathematical expression is determined. In one implementation, the determination can be made by accessing the math engine, which can be configured to resolve symbolic mathematical expressions.

In a step 530, a test graphing range is selected based on the expression type and trigonometry unit mode, and then points within the test graphing range are selected. As used herein, the phrase "test graphing range" is intended to mean a "first seed range" and/or "initial variable seed range," each of which seeks to describe a range that can be used as a starting range for an iterative process used to determine a graph range. In one implementation, the points are selected based on a random or pseudo-random number or sequence that is provided to a point selection control process.

In a step 540, each of the points is tested to determine if a predetermined percentage of the points are valid for the mathematical expression. If the predetermined percentage of points is not valid, the test range is windowed until the windowed predetermined percentage of points is determined to be valid. The valid points are then used to generate and/or define a graphing range for the mathematical expression. In one implementation, the defined graphing range is based on the test range and the value of the mathematical expression evaluated at each of the points. In another implementation, an application is enabled to generate a graph of the mathematical expression for display on a user display device based on the defined graphing range.

Figure 6:
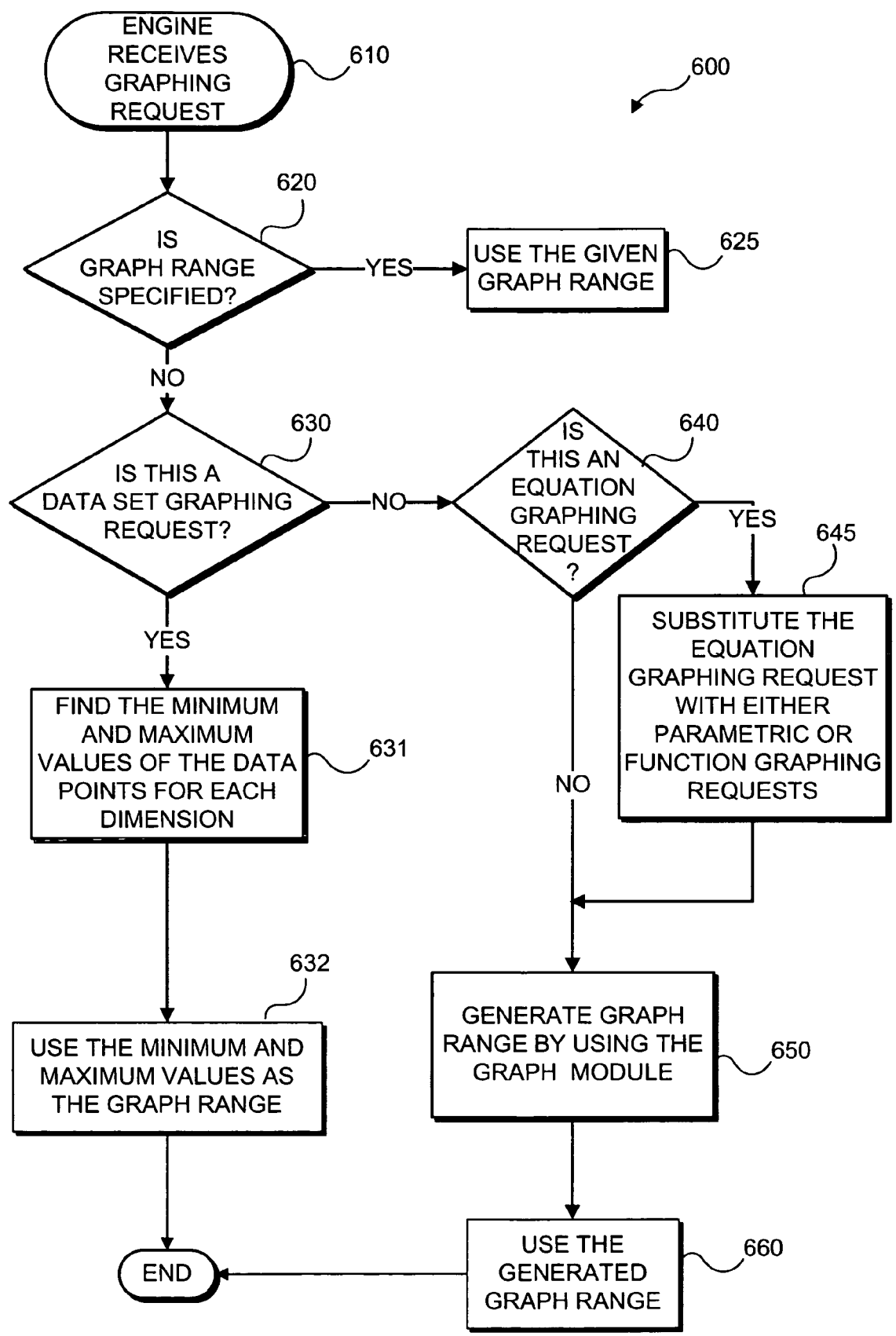
FIG. 6 is a flow diagram illustrating the steps of an exemplary method for selecting a seed range.

Turning now to specific exemplary embodiments, FIG. 6, is a flow diagram illustrating the steps of one exemplary method for selecting a graph range to graph a mathematical expression submitted by a user. Method 600 can be implemented in some embodiments with components, and techniques, as discussed above with reference to FIGS. 1-5. In some implementations, one or more steps of method 600 are embodied on a computer-readable medium containing computer-readable code so that a series of steps are implemented when the computer-readable code is executed on a computing device, such as a microprocessor. In the following description, various steps of the method 600 are described with respect to a processor of a computing device that can perform certain method steps. However, the computing device can also be in communication (as appropriate) with a server that can also perform certain method steps. In some implementations, certain steps of method 600 can be combined, performed simultaneously or in a different order, without deviating from the objective of method 600 or without producing different results.

Method 600 begins at a step 610 when an engine receives a graphing request. Generally, in the present exemplary embodiment, the engine is a math engine or a graphing engine. While not indicated in FIG. 6, the request can include a graph range submitted by a user. However, a graph range is not required to be submitted by a user in method 600. In a step 620, the logic determines whether a graph range is specified, e.g., whether a range was submitted by a user. When the determination in step 620 is affirmative, method 600 applies the specified graph range in order to graph an equation in a step 625, and then method 600 terminates. However, if the determination in step 620 is negative, method 600 proceeds to a step 630, where the logic determines whether the graphing request is a request for graphing a data set. When the determination in step 630 is affirmative, method 600 proceeds to a step 631 in order to find maximum and minimum values of the data set for each dimension.

In a step 632, the maximum and minimum data set values that were determined are used to define the graph range for the data set, and method 600 terminates. However, when the determination in step 630 is negative, method 600 proceeds to a step 640 where the logic determines if the graphing request is a request for graphing an equation. If so, method 600 proceeds to a step 645, which substitutes the equation graphing request with either a parametric or a function graphing request. Method 600 then proceeds to a step 650, which calls a graph module to generate a graph range. When the determination in step 640 is negative, method 600 proceeds directly to step 650. Once a graph range has been generated by the graph module in step 650, this newly generated graph range can be used to generate a graph of the mathematical function in a step 660, at which point method 600 terminates.

Figure 7:
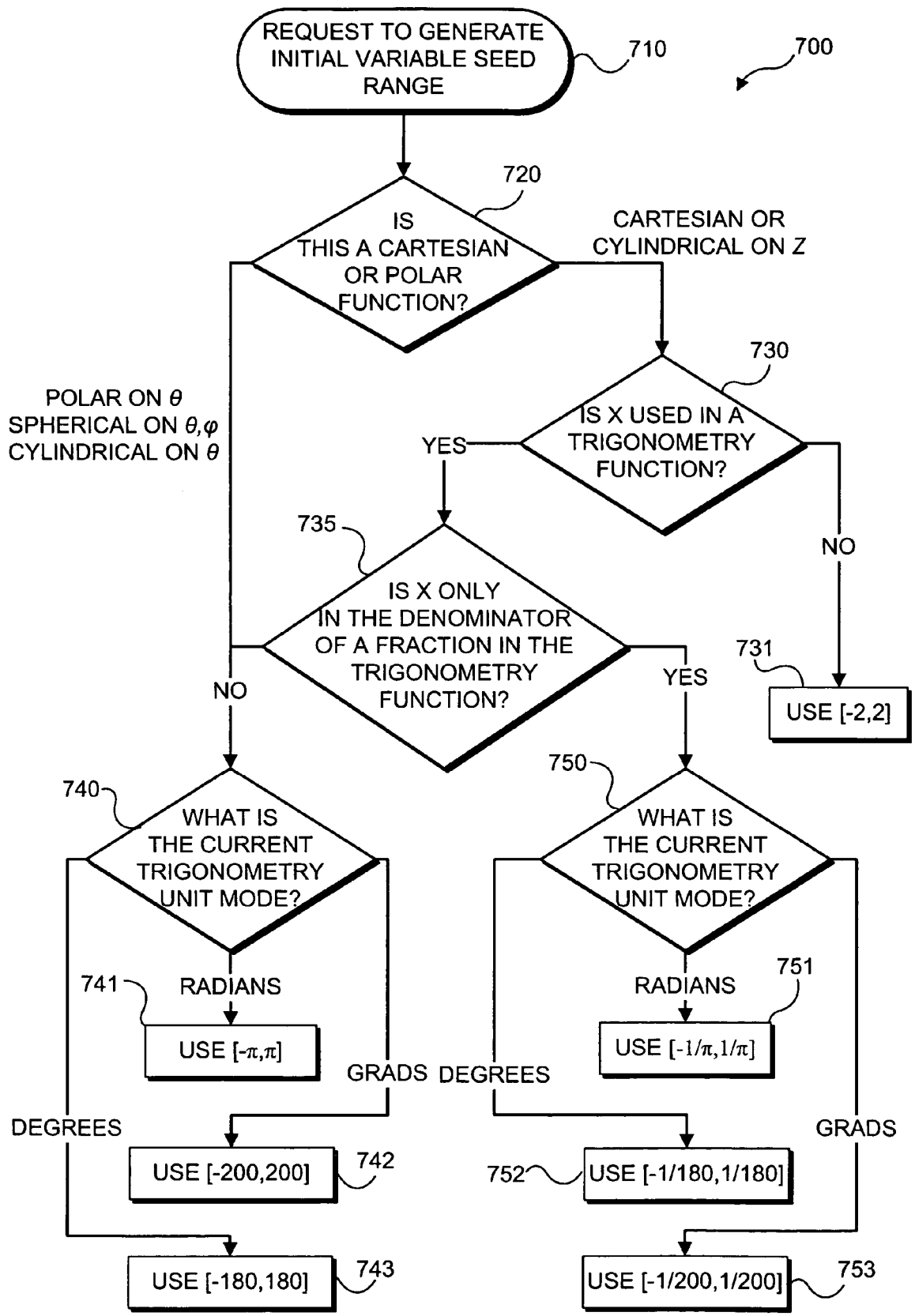
FIG. 7 is a flow diagram illustrating the steps of an exemplary method for selecting a seed range.

FIG. 7 is a flow diagram illustrating the steps of an exemplary method for selecting a seed range. Method 700 can be implemented in some embodiments with components, and techniques, as discussed above with reference to FIGS. 1-6. In some implementations, one or more steps of method 700 are embodied on a computer-readable medium containing computer-readable code so that a series of steps are implemented when the computer-readable code is executed on a computing device, such as a microprocessor. In the following description, various steps of the method 700 are described with respect to a processor of a computing device that can perform certain method steps. However, the computing device can also be in communication (as appropriate) with a server that can also perform certain of the method steps. In some implementations, certain steps of method 700 can be combined, performed simultaneously or in a different order, without deviating from the objective of method 700 or without producing different results.

Method 700 begins in a step 710 with receipt of a request to generate an initial variable seed range for a function input by a user. In a step 720, the logic determines whether the request is for a variable seed range for a Cartesian, or a polar or cylindrical function.

If the determination in step 720 indicates a polar function (polar on variable $\theta$, spherical on variables $\theta$, $\phi$, and cylindrical on variable $\theta$), the current trigonometry unit mode is then determined in a step 740. When the current trigonometry unit mode is determined to be radians in step 740, an initial variable seed range of $[-\pi, \pi]$ is generated in a step 741, and method 700 terminates. When the current trigonometry unit mode is determined to be grads in step 740, an initial variable seed range of $[-200, 200]$ is generated in a step 742, and method 700 terminates. When the current trigonometry unit mode is determined to be degrees in step 740, an initial variable seed range of $[-180°, 180°]$ is generated in a step 743, and method 700 terminates. The values given above for the initial variable seed range for the different modes are intended to only be exemplary and not in any way limiting, since other values can alternatively be used.

However, if the determination in step 720 indicates a Cartesian function, method 700 proceeds to a step 730 where the logic determines if "x" is used in a trigonometry function. If not, an initial seed range of $[-2, 2]$ is generated, and method 700 terminates. However, if determination in step 730 is affirmative, method 700 proceeds to a step 735 where the logic determines if "x" is only in the denominator of a fraction in a trigonometry function. If not, method 700 proceeds to step 740 and executes as described above. However, when the determination in step 735 is affirmative method 700 proceeds to a step 750 where the current trigonometry unit mode is determined. When the current trigonometry unit mode is determined to be radians in step 750, an initial variable seed range of $[-1/\pi, 1/\pi]$ is generated in a step 751, and method 700 terminates. When the current trigonometry unit mode is determined to be grads in step 750, an initial variable seed range of $[-1/200, 1/200]$ is generated in a step 753, and method 700 terminates. When the current trigonometry unit mode is determined to be degrees in step 750, an initial variable seed range of $[-1/180, 1/180]$ is generated in a step 752, and method 700 terminates. Again, the initial variable seed ranges given above are intended to be only exemplary and not limiting.

Other seed ranges not explicitly described in FIG. 7 can also be generated based upon the properties associated with a function type. For example, for a two-dimensional polar function $r=f(\theta)$, where r is the distance between a point and the origin, and 0 is the angle between the point and the positive x-axis, there are two differences compared to the implementation of a Cartesian function. Namely, for a two-dimensional polar function, the initial variable seed range for $\theta$ is always $[0, 2\pi]$, regardless whether it is used in a trigonometry function; and, after the ranges for both r and $\theta$ are obtained, trivial calculation can be carried out to determine the corresponding range for x and y in Cartesian coordinates.

For a two-dimensional parametric function $x=f(t)$, $y=g(t)$, the variable seed range is for the variable t, and a sample point is considered "good" if both x and y have valid function values for the sample point; the function value ranges of x and y are then calculated independently. For a two-dimensional polar parametric function $r=f(t)$, $\theta=g(t)$, the variable seed range is for variable t, and a sample point is considered "good" if both r and $\theta$ have valid function values on the sample point. In this implementation, the function value ranges of r and $\theta$ can be calculated independently. After the ranges for both r and $\theta$ are obtained, a trivial calculation is carried out to determine the corresponding range for x and y in Cartesian coordinates.

In one implementation, two-dimensional equations of the form $f(x, y)=0$ are not graphed directly. Instead, they are analyzed by the math engine and substituted by either two-dimensional parametric functions or two-dimensional Cartesian functions. Thus, one of the cases discussed above will be used to generate the graph range.

For three-dimensional Cartesian functions of the form $z=f(x,y)$, there are two variables in the function, and therefore, two initial variable seed ranges are needed. They can be generated independently by using the same heuristic approach used in the two-dimensional case illustrated above in method 700. Random sample points can be selected from the rectangular area defined by the two variable seed ranges, and the rest of the procedure can be implemented in a manner similar to the two-dimensional case.

For a three-dimensional spherical function $r=f(\theta, \phi)$, the seed range generation can be similar to the two-dimensional polar function case, since the initial variable seed ranges for both $\theta$ and $\phi$ are [0, $2\pi$] regardless whether they are used in trigonometry functions. After the ranges for r, $\theta$, and $\phi$ are obtained, a trivial calculation is carried out to determine the corresponding range for x, y, and z in Cartesian coordinates.

For a three-dimensional cylindrical function of the forum $r=f(\theta, z)$, the approach is similar to that employed for the three-dimensional spherical function described above, except that while the initial variable seed range for $\theta$ is already [0, $2\pi$], z can be treated as a normal variable, and its initial variable seed range can be generated by the heuristic approach described for two-dimensional Cartesian functions, e.g., as in method 700.

For a three-dimensional parametric line function, three-dimensional parametric surface function, three-dimensional spherical parametric line function, three-dimensional spherical parametric surface function, three-dimensional cylindrical parametric line function, and a three-dimensional cylindrical parametric surface function, the implementations of the present approach are similar to their two-dimensional counterparts described above.

For a three-dimensional equation of the form $f(x, y, z)=0$, the equations are not graphed directly. Instead they are analyzed by the math engine and substituted by either three dimensional parametric functions or three-dimensional Cartesian functions. Thus, one of the cases discussed above can be used to generate the graph range for each of these functions as well.

Figure 8:
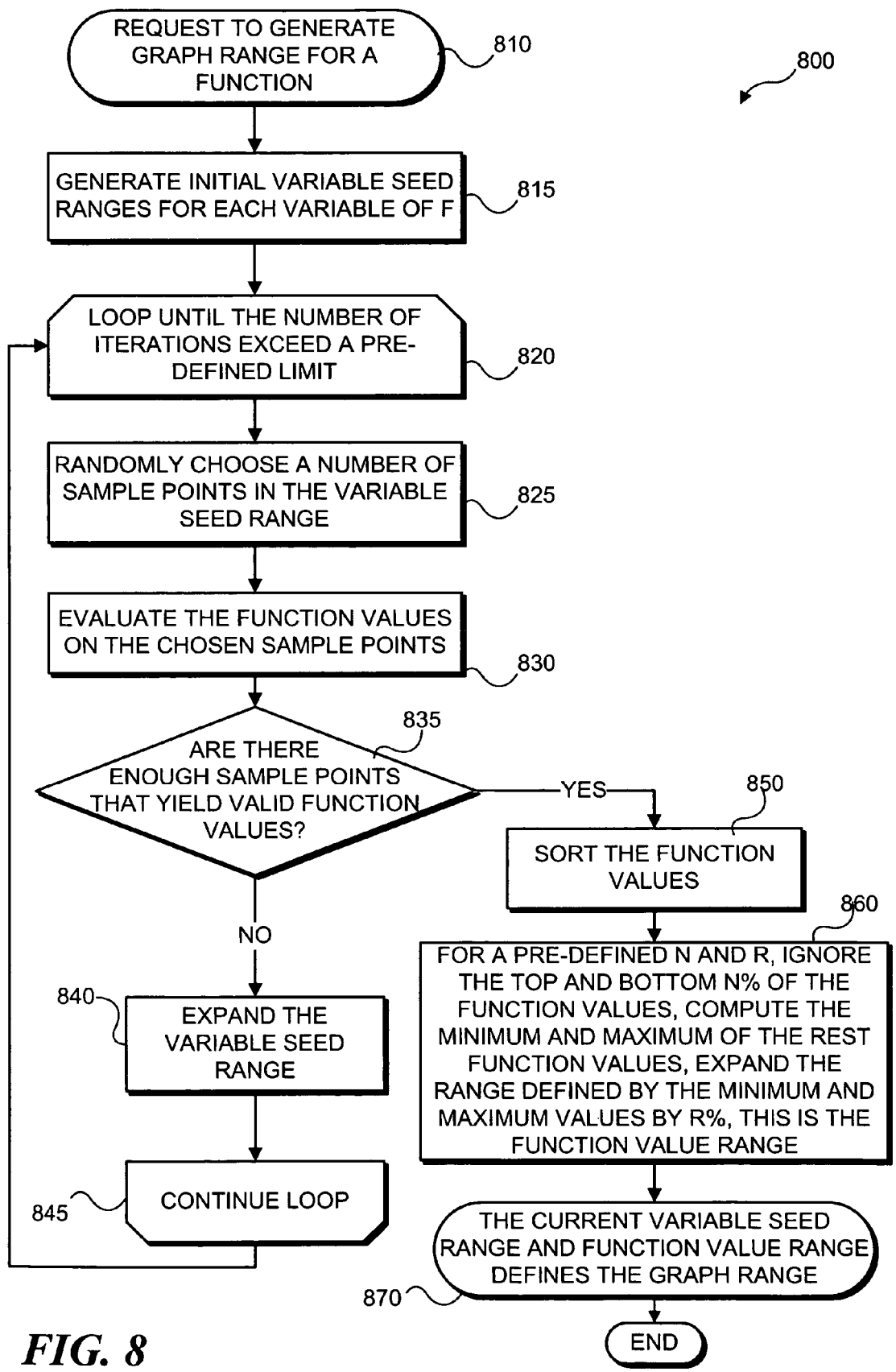
FIG. 8 is a flow diagram illustrating the steps of an exemplary method for generating a graph range.

FIG. 8 is a flow diagram illustrating the steps of an exemplary method for generating a graph range for a mathematical expression. Method 800 can be implemented in some embodiments with components, and techniques, as discussed with reference to FIGS. 1-7. In some implementations, one or more steps of method 800 are embodied on a computer-readable medium containing computer-readable code so that a series of steps are implemented when the computer-readable code is executed on a computing device, such as a microprocessor. In the following description, various steps of the method 800 are described with respect to a processor of a computing device that can perform certain method steps. However, the computing device can also be in communication (as appropriate) with a server that can also perform certain of the method steps. In some implementations, certain steps of method 800 can be combined, performed simultaneously or in a different order, without deviating from the objective of method 800 or without producing different results.

Method 800 begins in a step 810 with the receipt of a request to generate a graph range for a function. In this implementation the function is received from a user through a user interface. In a step 815, an initial variable seed range is generated for each variable of the function. In a step 820, a loop is opened for repeating steps within the loop until the number of iterations exceeds a predefined number of loops. In a step 825, a number of sample points are randomly chosen within the variable seed range. The points may be randomly selected in part by employing a random or pseudo-random number generator. In a step 830, the function is evaluated at the sample points. In one implementation, the function is evaluated at the sample points by a math engine. In a step 835, the logic determines whether there are enough sample points that yield valid function values. If not, in a step 840, the variable seed range is expanded, and method 800 proceeds to a step 845, which closes the do-until loop and returns control to step 820.

When the determination in step 835 is affirmative, method 800 proceeds to a step 850, and the valid function values are sorted. Method 800 then proceeds to a step 860, which selects a percentage of the function values and computes the maximum and minimum of the function values for the selected portion, the range defined by the minimum and maximum values can then be extended by a pre-defined percentage and the result used for the function value range. Method 800 then terminates in a step 870, which defines the graph range as the current variable seed range and the function value range.

Figure 9:
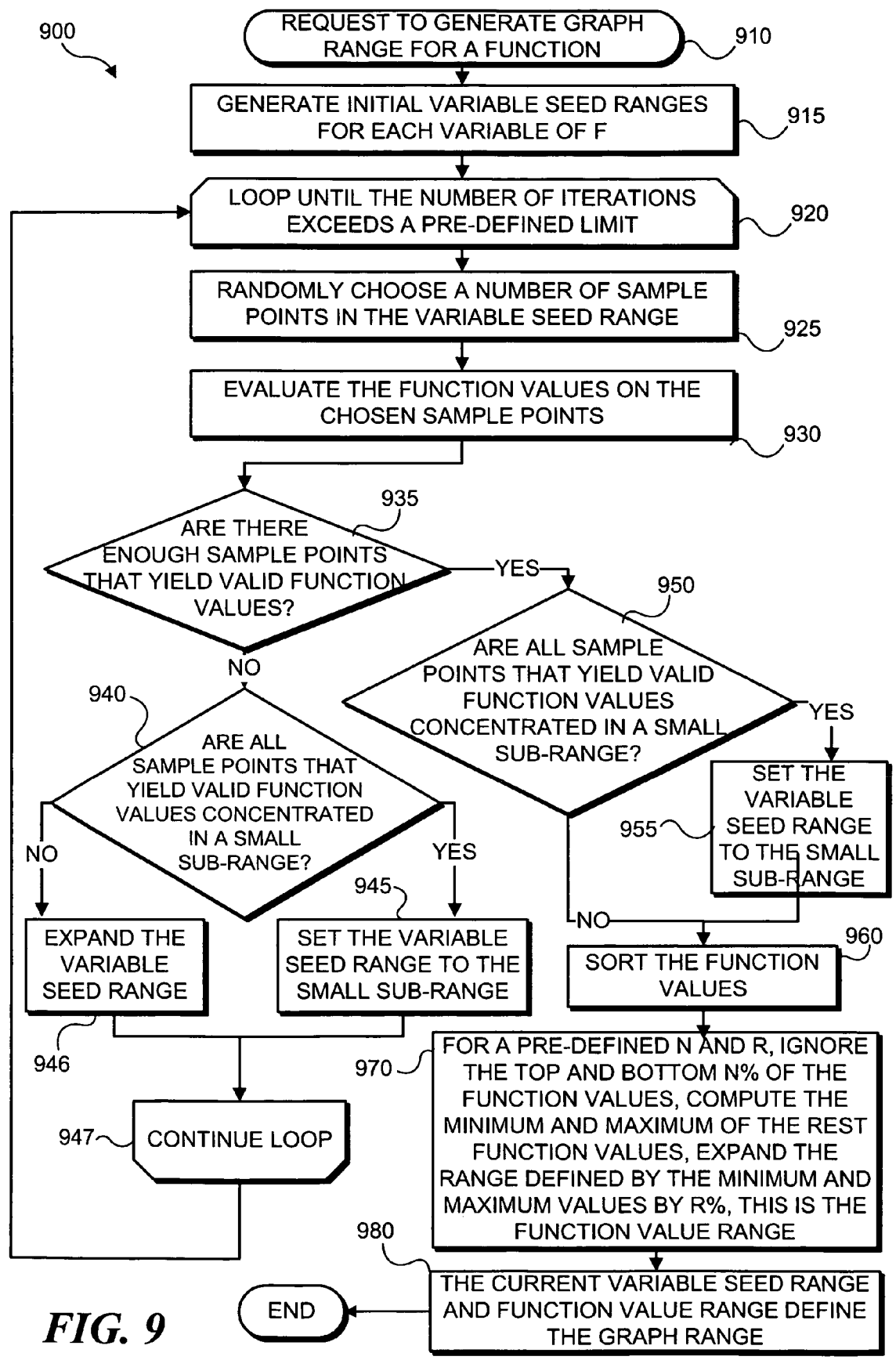
FIG. 9 is a flow diagram illustrating the steps of an exemplary method for generating a graph range for a function.

FIG. 9 is a flow diagram illustrating the steps of another exemplary method for generating a graph range for a mathematical expression. Method 900 can be implemented in some embodiments with components and techniques, as discussed with reference to FIGS. 1-8. In some implementations, one or more steps of method 900 are embodied on a computer-readable medium containing computer-readable code so that a series of steps are implemented when the computer-readable code is executed on a computing device, such as a microprocessor. In the following description, various steps of the method 900 are described with respect to a processor of a computing device that can perform certain method steps. However, the computing device can also be in communication (as appropriate) with a server that can also perform certain of the method steps. In some implementations, certain steps of method 900 can be combined, performed simultaneously or in a different order, without deviating from the objective of method 900 or without producing different results.

Method 900 begins in a step 910 with the receipt of a request to generate a graph range for a function. In this implementation, as in method 800 of FIG. 8, the function is received from a user through a user interface. In a step 915, an initial variable seed range is generated for each variable of the function. In a step 920, a loop is opened for repeating steps within the loop until the number of iterations exceeds a predefined number of loops. In a step 925, a number of sample points are randomly chosen within the variable seed range. The points may be randomly selected, in part by employing a random or pseudo-random number generator. In a step 930, the function is evaluated at the sample points, for example, by the math engine. In a step 935, the logic determines whether there are enough sample points that yield valid function values.

If the determination in step 935 is negative, method 900 proceeds to step 940, and the logic determines whether all the sample points that yield valid function values are concentrated in a small sub-range. If not, the variable seed range is expanded in a step 946, and method 900 proceeds to a step 947, closing the do-until loop and returning control to step 920. When the determination in step 935 is affirmative, method 900 proceeds to a step 945, and the variable seed range is set to the small sub-range, at which point, method 900 proceeds to step 947, closing the do-until loop and returning control to step 920.

If the determination in step 935 is affirmative, method 900 proceeds to a step 950, and the logic determines whether all of the sample points that yield valid function values are concentrated in a small sub-range. If not, method 900 proceeds directly to a step 960, which sorts the valid function values. When the determination in step 950 is affirmative, method 900 proceeds to a step 955, and the variable seed range is set to the small sub-range. Method 900 then proceeds to step 960, in which the valid function values are sorted. Method 900 then proceeds to a step 970, which selects a percentage of the function values, and computes the maximum and minimum of the function values in the selected portion, then the range defined by the minimum and maximum values can be extended by a pre-defined percentage and the result used for the function value range. In one implementation, the selected percentage of the function values is approximately the middle 60% of the data-points, and the expansion ratio can be 50% applied in each direction. It should be noted, however, that these values are merely exemplary and not limiting, and that any suitable data culling percentages and truncation thresholds may be applied or other appropriate data reduction techniques used with the presently described embodiments. Method 900 terminates in a step 980, which defines the graph range as the current variable seed range and the selected percentage function value range.

Figure 10:
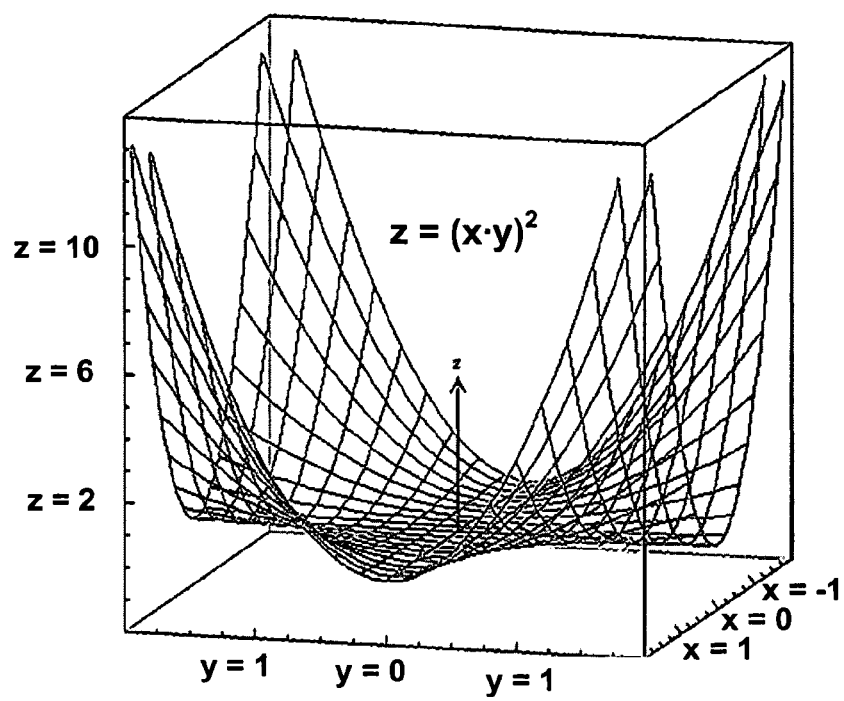
FIG. 10 is an exemplary graph illustrating an application of the present approach.

FIG. 10 is an exemplary graph illustrating an application of the flow diagrams of FIGS. 1-9. Specifically, FIG. 10 illustrates a three-dimensional Cartesian graph on variables x, y, and z. Graph ranges that have been generated according to one or more exemplary implementations described with reference to FIGS. 1-9 are illustrated for each variable in regard to its corresponding axis.

Figure 11:
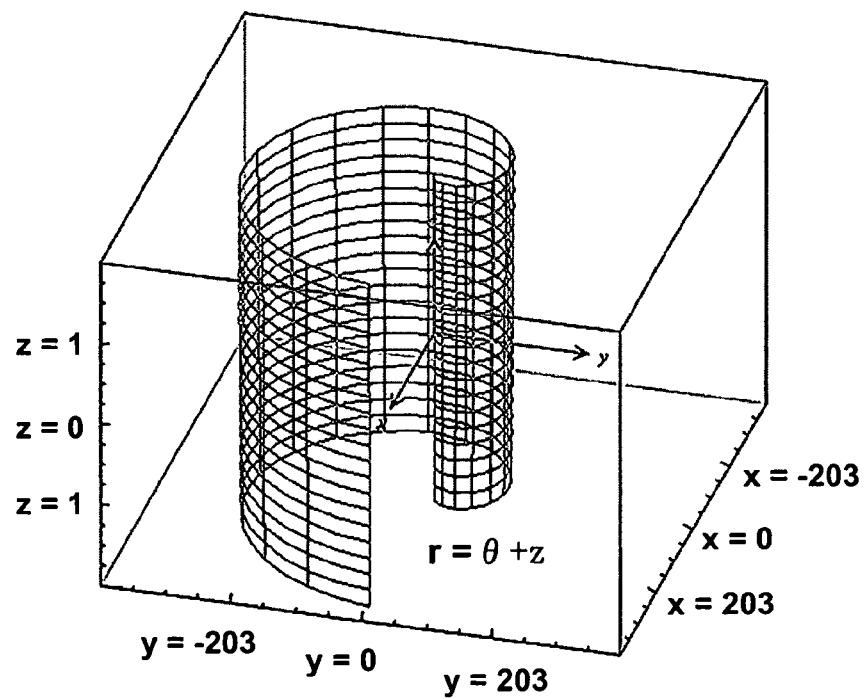
FIG. 11 is another exemplary graph illustrating an application of the present approach.

FIG. 11 is another exemplary graph illustrating an application of the systems and methods discussed above in regard to FIGS. 1-9. FIG. 11 illustrates a three-dimensional cylindrical graph on variables r, θ, and z. Graph ranges of FIG. 11, which are generated according to one or more implementations described with reference to FIGS. 1-9, are illustrated for each variable along a corresponding axis of the variable.

Figure 12:
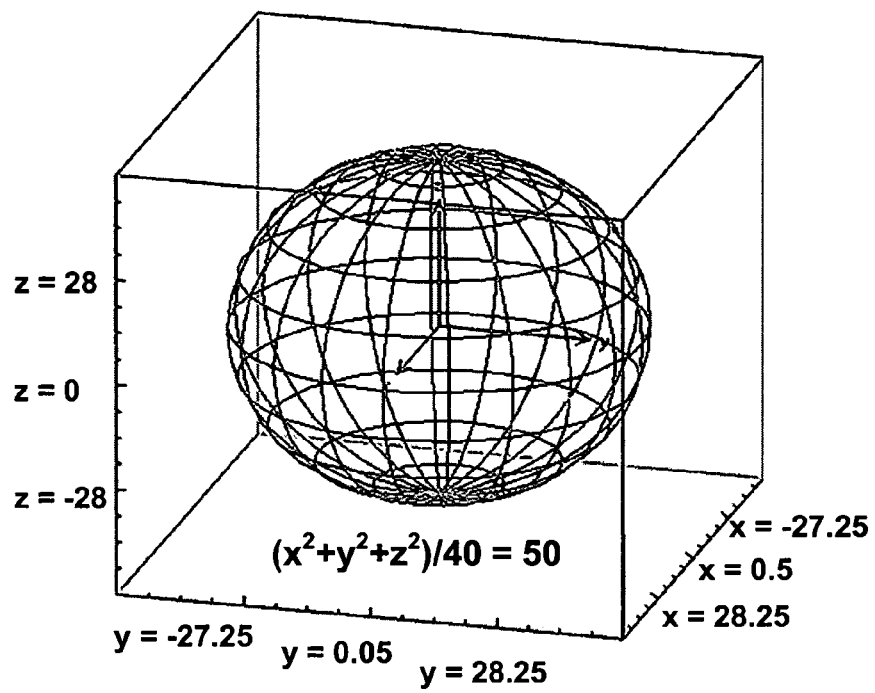
FIG. 12 is yet another exemplary graph illustrating an application of the present approach.

FIG. 12 is yet another exemplary graph illustrating an application of the systems and methods of diagrams of FIGS. 1-9. FIG. 12 again illustrates a three-dimensional Cartesian graph on variables x, y, and z, in which the graph ranges that have been generated by employing one or more of the implementations described above with reference to FIGS. 1-9 are illustrated for each variable along its corresponding axis. It should be noted the graph ranges for FIG. 12 are quite different from the graph ranges for FIG. 10, even though both graphs are three-dimensional Cartesian graphs for variables x, y, and z.

Figure 13:
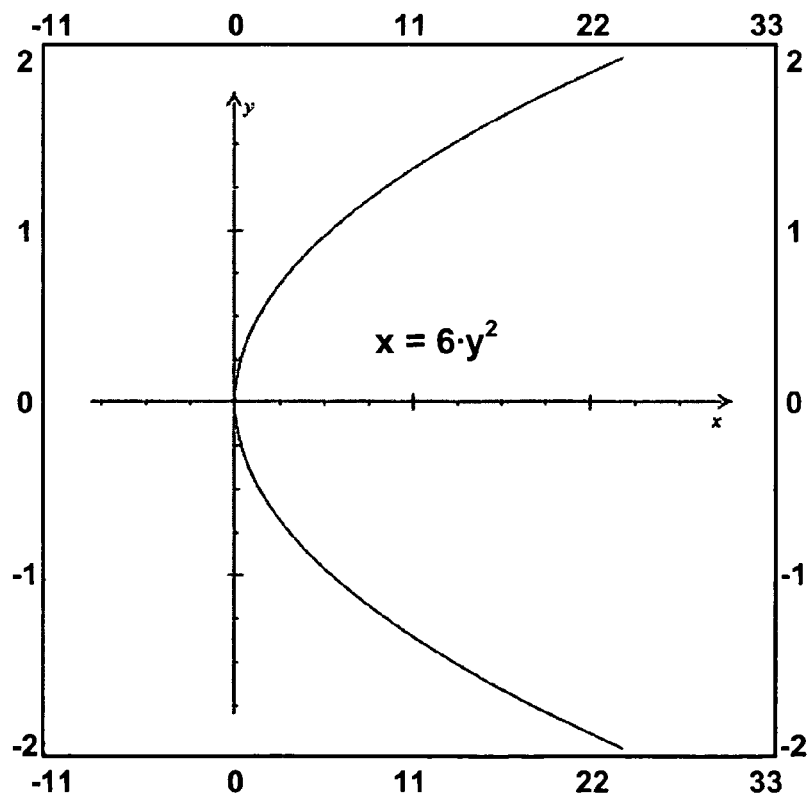
FIG. 13 is a still further exemplary graph illustrating an application of the present approach.

FIG. 13 is still another exemplary graph illustrating an application of the systems and methods of diagrams as discussed above in regard to FIGS. 1-9. FIG. 13 illustrates a two-dimensional Cartesian graph for variables x and y, in which the graph ranges have been automatically generated according to one or more of the implementations described above with reference to FIGS. 1-9. As can be seen in FIG. 13, the graph ranges are illustrated for each variable along the corresponding axis for that variable. It can be observed in FIG. 13 that the graph range for variable y is actually the seed range [−2, 2], even though the range for the x axis is not a seed range.

Although the present technique and apparatus for practicing has been described in connection with the preferred forms of practicing it and modifications thereto, those of ordinary skill in the art will understand that many other modifications can be made to the present technique and apparatus within the scope of the claims that follow. Accordingly, it is not intended that the scope of the technique and apparatus in any way be limited by the above description, but instead be determined entirely by reference to the claims that follow.

The invention in which an exclusive right is claimed is defined by the following:

1. A computer implemented method for graphing a mathematical expression without requiring a user to provide a graph range at a computer system having a graphing module which has been hard-coded with a plurality of predetermined seed ranges corresponding to different combinations of mathematical expression function types and trigonometric unit modes, comprising the computer implemented steps of:
   a computer system receiving input identifying a function type of a mathematical expression to be graphed, wherein the function type is one of:
      (i) a Cartesian function;
      (ii) a polar function;
      (iii) a cylindrical function; and
      (iv) a spherical function;
   the computer system receiving input identifying a user selected trigonometry unit mode, wherein the trigonometry unit mode comprises one of:
      (i) degrees;
      (ii) radians; and
      (iii) grads; and
   the computer system identifying a plurality of predetermined variable seed ranges that have been hard-coded into a graphing module of the computer system and that correspond to different combinations of the mathematical expression function types and trigonometric unit modes;
   the computer system selecting an initial variable seed range from the plurality of predetermined variable seed ranges that have been hard-coded into the graphing module of the computer system and that is associated with the identified function type and the identified trigonometry unit mode;
   (b) selecting a plurality of points within the initial variable seed range; and
   (c) determining if the plurality of points selected corresponds to the mathematical expression, and if so, using the points selected to generate and display a graph of the mathematical expression on a user display device, and if not, then selectively expanding the variable seed range until a predetermined number of the points selected correspond to the mathematical expression, so as to enable the graph of the mathematical expression displayed.

2. The method of claim 1, wherein the plurality of predetermined variable seed ranges that are hardcoded into the graphing module are selected from the group comprising:
   (a) a range in degrees comprising [-180, 180];
   (b) a range in radians comprising [-π, π];

(c) a range in grads comprising [-200, 200];
(d) a range in degrees comprising [-1/180, 1/180];
(e) a range in radians comprising [-1/π, 1/π];
(f) a range in grads comprising [-1/200, 1/200]; and
(g) a range comprising [-2,2] for non-polar and non-trigonometry functions.

3. The method of claim 1, wherein the step of determining if the plurality of points selected corresponds to the mathematical expression comprises the steps of:
   (a) evaluating the mathematical expression at each of the plurality of points;
   (b) determining whether each point evaluated corresponds to a valid point for graphing, and if not, identifying the point as an invalid point; and
   (c) determining if a predetermined number of the plurality of points within the initial variable seed range have been identified as invalid, and if so, indicating that the initial variable seed range does not contain enough valid points for graphing the mathematical expression.

4. The method of claim 3, further comprising the steps of:
   (a) detecting when the initial variable seed range does not contain enough valid points for graphing the mathematical expression; and
   (b) generating a second seed range based on the initial variable seed range by applying a predetermined scaling factor to the initial variable seed range.

5. The method of claim 3, further comprising the steps of:
   (a) determining if each of the plurality of points are within a sub-range of the initial variable seed range; and if so,
   (b) substituting the sub-range for the initial variable seed range.

6. The method of claim 1, wherein the step of selecting points within the initial variable seed range comprises the. step of applying a substantially random number sequence to identify the points that are selected within the initial variable seed range, the points that are selected thus being substantially randomly selected.

7. The method of claim 6, wherein the step of applying a substantially random number sequence comprises the step of invoking a pseudo-random number generator to generate the substantially random number sequence.

8. The method of claim 1, wherein the step of using the points selected to generate and display a graph of the mathematical expression on a user display device comprises the steps of:
   (a) sorting the plurality of points;
   (b) identifying a portion of the plurality of points; and
   (c) applying a predetermined scaling factor to the portion of points.

9. A method as recited in claim 1, wherein the predetermined number of points is a certain percentage of a total number of the plurality of points selected within the initial variable seed range and such that selectively expanding the variable seed range occurs until the certain percentage of the predetermined number of the points corresponds to the mathematical expression.

10. A computer-readable storage medium storing computer-readable instructions for performing the method recited in claim 1.

11. The computer-readable storage medium of claim 10, wherein the method further comprises:
   (a) evaluating the mathematical expression at each of the points selected;
   (b) determining whether each of the points evaluated has a graphable value based on predetermined criteria, and if not, identifying the point as an invalid point; and
   (c) determining if a predetermined number of the plurality of points within the seed range are invalid, and if so, setting a flag to indicate that the initial variable seed range does not contain enough valid points for graphing the mathematical expression.

12. The computer-readable storage medium of claim 11, wherein the method further comprises:
   (a) detecting the flag indicating that the initial variable seed range does not contain enough valid points for graphing the mathematical expression based on predetermined criteria; and
   (b) in response to detecting the flag, generating at least a second seed range, at least in part based on the first seed range, by applying a predetermined scaling factor to the initial variable seed range to increase the number of available points.

13. The computer-readable storage medium of claim 10, wherein the method further comprises:
   determining if each of the of points selected are located within a sub-range of the initial variable seed range, the sub-range being defined as a predetermined percentage of the first seed range, and if so, substituting the sub-range for the initial variable seed range.

14. The computer-readable storage medium of claim 10, wherein the method further comprises:
   (a) sorting the plurality of points;
   (b) identifying a portion of the plurality of points; and
   (c) applying a predetermined scaling factor to the portion of points identified.

15. The computer-readable storage medium of claim 10, wherein the method further comprises:
   (a) invoking a pseudo-random number generator to generate a substantially random number sequence; and
   (b) employing the substantially random number sequence for selecting the points, to produce a plurality of substantially random points selected within the initial variable seed range.

16. A system for graphing a mathematical expression, comprising:
   at least a first computing having a processor in communication with a memory in which are stored a plurality of hard-coded seed ranges and computer-executable instructions for implementing the method recited in claim 1.

17. The system of claim 16, wherein the method further comprises:
   (a) evaluating the mathematical expression at each of the plurality of points selected within a test graphing range;
   (b) determining whether each point evaluated corresponds to a valid point for graphing, and if not, then identifying the point as an invalid point; and
   (c) determining if a predetermined number of the plurality of points within the initial variable seed range are invalid, and if so, generating a new test graphing range by windowing the test graphing range using a predetermined scaling factor.

18. The system of claim 16, wherein the method carried out by the graphing module further comprises:
   (a) determining when the plurality of points selected are within a sub-range of the test graphing range; and
   (b) substituting the sub-range for the test graphing range.

19. The system of claim 16, further comprising a random number generator software module that is used for selecting the points in the test graphing range, so that the points selected are substantially random.

* * * * *